United States Patent [19]

Nagata

[11] Patent Number: 4,659,052
[45] Date of Patent: Apr. 21, 1987

[54] VERTICAL ADJUSTMENT SUPPORT DEVICE FOR A VEHICLE SEAT

[75] Inventor: Shojiro Nagata, Akishima, Japan

[73] Assignee: Tachikawa Spring Co., Ltd., Tokyo, Japan

[21] Appl. No.: 824,263

[22] Filed: Jan. 30, 1986

[30] Foreign Application Priority Data

Jan. 31, 1985 [JP] Japan .............................. 60-12414[U]

[51] Int. Cl.$^4$ .............................................. B60N 1/02
[52] U.S. Cl. ................................... 248/575; 248/588; 248/421; 248/412; 248/231.2; 248/316.2; 267/177
[58] Field of Search ............... 248/157, 421, 561, 575, 248/576, 584, 412, 231.3, 316.2, 588; 267/172, 131, 175, 177; 108/136; 297/347

[56] References Cited

U.S. PATENT DOCUMENTS

| | | | |
|---|---|---|---|
| 461,238 | 10/1891 | Cox et al. | 248/412 |
| 1,859,223 | 5/1932 | Stevenson | 248/412 |
| 3,339,906 | 9/1965 | Persson | 267/131 |
| 3,761,045 | 9/1973 | Sturhan | 248/576 |
| 4,072,287 | 2/1978 | Swenson et al. | 248/588 |
| 4,093,197 | 6/1978 | Carter et al. | 267/131 |
| 4,128,274 | 12/1978 | Schmedemann | 248/412 |
| 4,295,627 | 10/1981 | Graves | 248/588 |
| 4,312,491 | 1/1982 | Aondetto | 248/421 |
| 4,573,657 | 3/1986 | Sakamoto | 248/588 |

FOREIGN PATENT DOCUMENTS 571084 12/1957 Italy ................................. 248/412

Primary Examiner—Cornelius J. Husar
Assistant Examiner—Eric K. Nicholson
Attorney, Agent, or Firm—Cushman, Darby & Cushman

[57] ABSTRACT

A weight adjustment support device for a vehicle seat such as an automotive seat is disclosed which is capable of adjusting the cushioning property of the seat according to weights or taste of an occupant. The device includes a mounting frame and a seat supporting frame on which the seat is placed. A pair of X-shaped expansion legs are provided between the two frames to be able to raise or fall the seat supporting frame vertically. A pair of wedge members are provided to secure one end of the expansion leg via elastic means. The two wedge members are combined such that the slanting surface of one wedge member having a grade is applied against the slanting surface of the other wedge member having the same but oppositely directed grade. The one wedge member is then moved by means of a feed mechanism to vary the distance between the respective bottom surfaces of the two wedge members so as to be able to adjust the energizing forces of the elastic means.

4 Claims, 3 Drawing Figures

VERTICAL ADJUSTMENT SUPPORT DEVICE FOR A VEHICLE SEAT

BACKGROUND OF THE INVENTION

1. Field of the Invention

The present invention relates to a weight adjustment support device for a vehicle seat such as an automotive seat which is capable of adjusting its cushioning property for weight adjustments according to the weights and tastes of occupants of the seat and, more particularly, to improvements relating to U.S. Pat. No. 4,573,657.

2. Description of the Prior Art

In the above mentioned U.S. Pat. No. 4,573,657, there is disclosed a vertical adjustment device for a vehicle seat in which a slight rotation of an operation lever permits adjustments of the cushioning property of the seat according to the weights of occupants of the seat. According to the above application, there are interposed a pair of X-shaped expansion legs between a mounting frame positioned on the side of a vehicle body and a seat support frame on the side of the seat; the two expansion legs are provided therebetween with springs which energize the expansion legs in a direction of sliding of the expansion legs; and, the above-mentioned operation lever is attached to a cam which adjusts the elastic forces of the springs. Thus, by means of operation of the operation lever, the cam can be rotated against the elastic forces of the springs to adjust the elastic forces of the springs so as to obtain the proper cushioning property of the seat according to the weights of the occupants.

As described above, the vertical adjustment device disclosed in the above application is satisfactory as a device using an operation lever. However, there remains still a disadvantage in the above-mentioned vertical adjustment device; that is, a stepless and smooth adjustment of the elastic forces of the springs can not be performed due to the fact that the cam is rotated by means of the operation lever.

SUMMARY OF THE INVENTION

Accordingly, the main object of the present invention is to provide a weight adjustment support device for a vehicle seat which is simple in structure, is inexpensive in cost, and permits a stepless and smooth adjustment with a small operation force, while eliminating the drawbacks found in the prior art devices.

In order to accomplish the above object, according to the invention, a pair of X-shaped expansion legs are provided between a mounting frame and a seat supporting frame, each of the X-shaped expansion legs including first and second links so as to be able to move in a vertical direction the seat supporting frame on which a seat is placed a link of; each of the expansion legs is slidable at one end thereof which is secured via elastic means to a pair of wedge members; the two wedge members securing the elastic means are combined such that the slanting surface of one wedge member faces and makes contact with the slanting surface of the other wedge member having the opposite grade; and, one of the wedge members can be moved by a feed mechanism to vary the distance between the bottom surfaces of the paired wedge members so as to change the elastic forces of the elastic means and hence to adjust the cushioning property of the seat.

Therefore, in the present invention, since a simple structure is employed that one of the paired wedge members is moved by the feed mechanism to slide the two wedge members with the slanting surfaces thereof being in contact with each other, a great load to be applied to the elastic means can be eased, permitting a stepless, smooth and stable adjustment of the cushioning property of the seat according to the weights of the occupants of the same with a small force by means of the above-mentioned feed mechanism.

Other objects and aspects of the invention will become apparent from the following description of embodiments with reference to the accompanying drawings.

DETAILED DESCRIPTION OF PREFERRED EMBODIMENTS OF THE INVENTION

Figure 1:
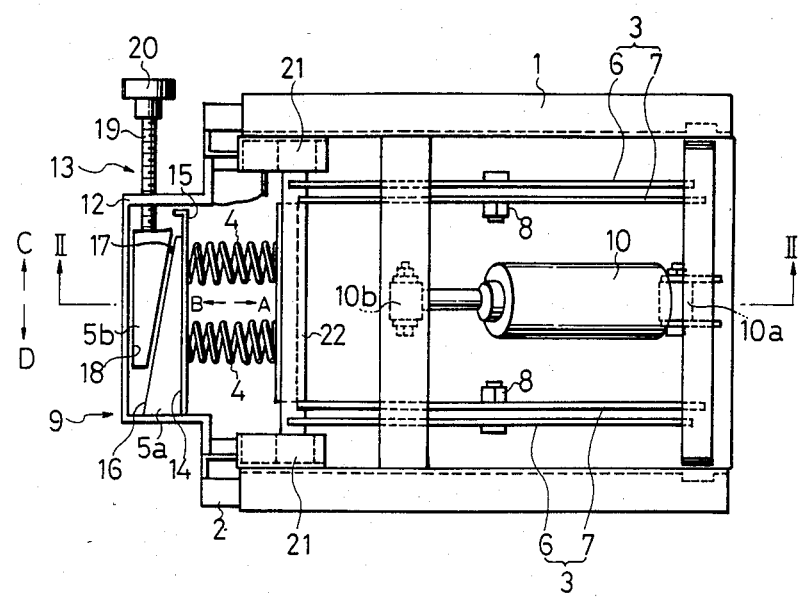
FIG. 1 is a plan view of a first embodiment of a weight adjustment support device for a vehicle seat constructed in accordance with the invention.
Figure 2:
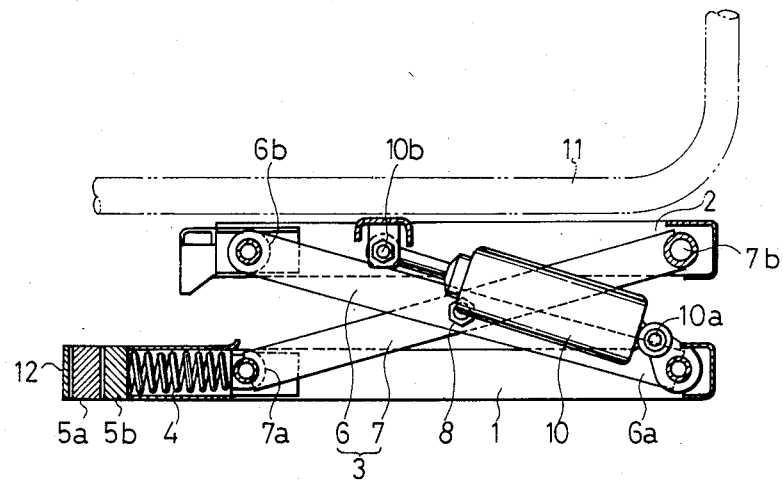
FIG. 2 is a section view of the above embodiment taken along line II—II in FIG. 1; and, FIG. 3 is a section view of a second embodiment of the invention.

Now, we will describe a first embodiment of a weight adjustment support device for a vehicle seat or the like according to the invention in connection with FIGS. 1 and 2.

In the drawings, reference numeral (1) designates a mounting frame which serves as a base of the weight adjustment support device for a vehicle seat of the invention. In the two side portions of the mounting frame (1), respectively, there are provided two X-shaped expansion legs (3) each having a first link (6) and a second link (7) which are rotatably mounted at the respective central portions thereof by means of a shaft member (8).

In other words, the lower end (6a) of the first link (6) of the expansion leg (3) is rotatbly mounted to the rear end of the mounting frame (1), and the upper end (6b) of the first link (6) is slidably mounted to the front end of a seat supporting frame (2).

Also, the upper end (7b) of the second link (7) is rotatably mounted to the rear end of the seat supporting frame (2). Further, the lower end (7a) of the second link (7) is rotatably mounted to a support member (22) having two ends which are guided by a pair of slide guide means (21) provided in the mounting frame (1). And, the sides of this support member (22) are supported by energizing force adjustment means (9) via spring means (4) comprising two compression springs which are parallel located.

The above-mentioned energizing force adjustment means (9) comprises a pair of wedge members (5a), (5b) respectively provided in a rectangular frame (12) and a screw feed mechanism (13).

One (5a) of the wedge members is adapted to come in contact with the spring or elastic means (4) to support the latter. That is, the wedge member (5a) is formed in a right triangle and includes a bottom surface (14) which makes contact with the elastic means (4). A thrust bracket (15) is fixedly secured to the bottom surface (14).

The above-mentioned thrust bracket (15) has a portion which projects from the wedge member (5a) and is bent such that it has an L-shaped side configuration. This bent portion of the thrust bracket (15), being disposed immediately adjacent the inner wall of the rectangular frame (12), serves as a guide which allows the wedge member (5a) to move in the direction of an arrow A or B (shown in FIG. 1) along the internal wall of the rectangular frame (12).

Also, within the rectangular frame (12), the other wedge member (5b) is provided such that the slanting surface (17) of the wedge member (5b) faces and makes contact with the slanting surface (16) of the wedge member (5a).

The grade of the slanting surface (16) of one wedge member (5a) is equal to that of the slanting surface (17) of the other wedge member (5b). Thus, when the two wedge members (5a) (5b) are mated with each other such that the respective slanting surfaces (16) and (17) thereof are faced to and brought into contact with each other, the respective bottom surface (14) and (18) of the two wedge members (5a) and (5b) are located parallel with each other.

The wedge member (5b) is adapted such that it can be moved in the direction of an arrow C or D by means of the screw feed mechanism, as shown in FIG. 1. The screw feed mechanism (13) is constructed by threadedly inserting a screw rod (19) into a threaded bore formed at a given position in one side portion of the rectangular frame (12), connecting the tip end of the screw rod (19) rotatably to the wedge member (5b), and fixing a rotation knob (20) to a free end of the screw rod (19).

Figure 3:
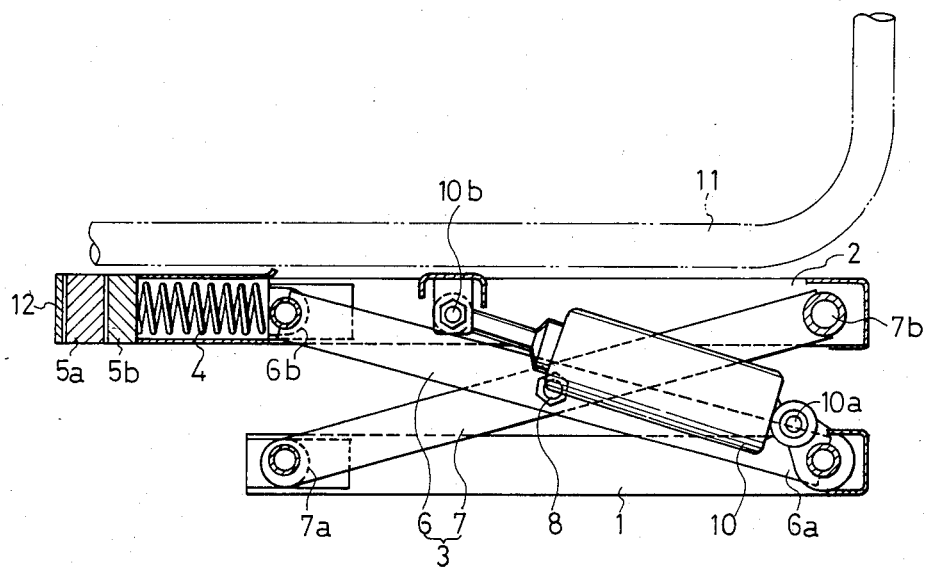

Referring now to FIG. 3, there is illustrated a case in which the above-mentioned energizing force adjustment means (9) is provided in a part of the seat supporting frame (2) to facilitate the operation of the rotation knob (21) since it is moved vertically together with the seat supporting frame (2).

According to the last-mentioned embodiment of the invention, the energizing force adjustment means (9) can be adjusted to move forwardly and backwardly with respect to the mounting frame (1) so as to permit adjustment of the height of the expansion leg (3).

Also, in the second embodiment, the rear portion (10a) of a shock absorber (10) is journalled at the rear end of the mounting frame (1) and the front portion (10b) of the shock absorber (10) is journalled in the central portion of the seat supporting frame (2) so as to ease the vertical vibrations of the weight adjustment support device of the invention.

Further, onto the upper portion of the seat supporting frame (2) is rigidly fixed a frame (11) of a vehicle seat (not shown), on which frame (11) the vehicle seat is placed.

Next, we will describe the use and operation of the present device constructed in the above-mentioned manner.

First, in order to increase the energizing forces for bearing the seat supporting frame (2) of the illustrated weight adjustment support device, the rotation knob (21) of the energizing force adjustment means (9) is rotated to threadedly advance the screw rod (19), when the wedge member (5b) engaged with the screw rod (19) is moved in the direction of the shown arrow D. Following this, the slanting surface (17) of the wedge member (5b) guided along and supported by the internal wall of the rectangular frame (12) and the slanting surface (16) of the wedge member (5a) applied against the slanting surface (17) are slided relative to each other to move the wedge member (5a) in the direction of the shown arrow A and hence to increase the distance between the bottom surfaces (14) and (18) of the paired wedge members (5a) and (5b), so that the elastic means (4) is pressed and compressed. Thus, since the energizing forces of the elastic means (4) can be increased when a preload is applied thereto, a user of the seat is able to operate the rotation knob (20) to adjust the energizing or elastic forces of the elastic means (4) to his or her desired level.

Next, to reduce the energizing forces of the elastic means for bearing the seat supporting frame (2) of the same weight adjustment support device, the rotation knob (20) of the energizng force adjustment means (9) is operated in the opposite direction to retreat the screw rod (19) in a threadedly rotary manner. Then, the wedge member (5b) engaged with the screw rod (19) is moved back in the direction of the shown arrow C and, following this, the slanting surface (17) of the wedge member (5b) and the slanting surface (16) of the wedge member (5a) applied against the slanting surface (17) are slided relative to each other to bring back the wedge member (5a) in the direction of the shown arrow B and hence to narrow the distance between the bottom surfaces (14) and (18) of the paired wedge member (5a) and (5b), thereby causing the elastic means to extend or stretch. Since the energizing forces or elastic forces of the elastic means (4) becomes weakened when the preload applied thereto is reduced and thus it is stretched, the user of the seat is able to adjust or weaken the energizing forces of the elastic means (4) as desired.

As described above, during the operation of the energizing force adjustment means (9), since the thrust bracket (15) is guided along and supported by the internal wall of the rectangular frame (12), as the wedge member (5b) moves in the direction of the arrow C or D, the wedge member (5a) does not move in the same direction of the arrow C or D, but it advances or retreats smoothly in the direction of the arrow A or B.

Also, since the two wedge members (5a) and (5b) are face-to-face mated with each other, their mutual supporting condition is stabilized. Further, because the elastic means (4) is compressed utilizing the so-called wedge effects provided by the mutually facing and contacting slanting surfaces (16) (17) of the paired wedge members (5a) (5b), the energizing force adjustment means (9) can be operated simply with a small force to compress the elastic means (4) against the great elastic forces thereof.

As has been described in detail hereinbefore, according to the weight adjustment support device for a vehicle seat of the invention, a combined use of a pair of wedge members each having a slanting surface can simplify the structure thereof. Therefore, the present invention has effects that inexpensive products can be supplied as well as that it permits a stepless and stable adjustment with a small operational force.

What is claimed is:

1. A vertical adjustment device for use in a seat of a vehicle comprising:

a mounting frame adapted to be fixed to the vehicle;

a seat supporting frame adapted to receive the seat of the vehicle thereon;

a pair of X-shaped expansion legs each having a first link and a second link, said first and second links of each said expansion leg being pivotally mounted at their respective central portions so as to provide an X-shaped configuration, each said first link being slidably coupled to said seat supporting frame at an upper end thereof and being pivotally coupled to said mounting frame at a lower end thereof, each said second link being pivotally coupled to said seat supporting frame at an upper end thereof and being slidably coupled to said mounting frame at a lower end thereof, the pivotal mounting of the links of each of said X-shaped expansion legs enabling relative rotation so that each of the X-shaped expansion legs can raise and lower said seat supporting frame;

a support member disposed at an end of at least one of said first and second links of each of said X-shaped expansion legs;

elastic means secured at one end thereof to said support member, said elastic means being adapted to energize said expansion legs;

energizing force adjustment means for adjusting the energizing force of said elastic means, said energizing force adjustment means including:

(a) a pair of wedge members, each being formed in a right triangle configuration and having a slanting surface with a grade and a bottom surface, said pair of wedge members being combined with each other such that the slanting surface of one of said wedge members is in a slidable contact with the slanting surface of the other wedge member whose grade is identical to and in an opposite direction in relation to that of said one wedge member so that the bottom surface of said one wedge member is in a parallel relation to the bottom surface of said other wedge member, said bottom surface of said other wedge member being secured to the end of said elastic means opposite said one end of said elastic means; and (b) a feed screw mechanism operatively coupled to said one wedge member, said feed screw mechanism being adapted to move said one wedge member in a direction transversely to a longitudinal direction of said elastic means, whereby forward movement of said one wedge member by operation of said feed screw member causes said other wedge member to move in a direction which increases the energizing force of said elastic means so as to rotate said links of each said pair of X-shaped expansion legs and cause the raising of said seat supporting frame, and a rearward movement of said one wedge member by operation of said feed screw member causes said other wedge member to move in a direction which decreases the energizing force of said elastic means so as to rotate said links of each said pair of X-shaped expansion legs and cause the lowering of said seat supporting frame.

2. The vertical adjustment device according to claim 1, wherein said elastic means and said energizing force adjustment means are disposed in said supporting frame and said expansion legs are slidably attached to said elastic means.

3. The vertical adjustment device according to claim 1, wherein said elastic means comprises a pair of compression coil springs.

4. The vertical adjustment device according to claim 1, wherein said pair of wedge members are disposed in a rectilinear frame disposed in said mounting frame.

* * * * *